(12) United States Patent  
Itoh

(10) Patent No.: US 6,557,836 B2
(45) Date of Patent: May 6, 2003

(54) LIQUID-FILLED TYPE VIBRATION ISOLATING DEVICE AND MANUFACTURING METHOD THEREOF

(75) Inventor: Masaaki Itoh, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 5 days.

(21) Appl. No.: 09/864,777

(22) Filed: May 24, 2001

(65) Prior Publication Data

US 2002/0175456 A1 Nov. 28, 2002

(51) Int. Cl.7 .................................................. F16F 13/00
(52) U.S. Cl. .................................................. 267/140.11
(58) Field of Search ........................ 267/140.11, 140.12, 267/141.1–141.5, 141.7

(56) References Cited

U.S. PATENT DOCUMENTS

| | | |
|---|---|---|
| 4,687,188 A | 8/1987 | Knurek et al. |
| 4,693,456 A | 9/1987 | Kanda |
| 4,702,346 A | 10/1987 | Uno et al. |
| 4,728,086 A | 3/1988 | Ishiyama et al. |
| 4,953,833 A * | 9/1990 | Schmidt et al. .......... 267/140.12 |
| 5,102,106 A | 4/1992 | Thelamon et al. |
| 5,145,155 A | 9/1992 | Funahashi et al. |
| 5,259,294 A | 11/1993 | May |
| 5,286,011 A * | 2/1994 | Strand ................. 267/140.12 |
| 5,595,373 A * | 1/1997 | Ikeda .................. 267/140.12 |
| 6,102,380 A | 8/2000 | Tsutsumida |
| 6,349,926 B1 * | 2/2002 | Itoh ..................... 267/140.12 |
| 6,364,298 B1 * | 4/2002 | Vossel et al. ............. 267/293 |
| 2001/0052663 A1 * | 12/2001 | Katagari ............... 267/140.12 |

\* cited by examiner

Primary Examiner—Christopher P. Schwartz
(74) Attorney, Agent, or Firm—Jordan and Hamburg LLP

(57) ABSTRACT

The present invention is to provide a liquid-filled type vibration isolator with the reduced number of parts and good productivity. The vibration insulator comprises an inner cylinder, a first ring approximately L-shaped in cross section, a second ring, an orifice ring approximately U-shaped in cross section and arranged between the first ring and the second ring, and an elastic member of rubber material integrally combined with an outer periphery surface of the inner cylinder and inner periphery surfaces of the first ring, the orifice ring, and the second ring. The elastic member is provided with a first groove and a second groove, an outer cylinder is combined with the first ring and the second ring on the outside of them, the outer cylinder and the first groove form a first liquid chamber, the outer cylinder and the second groove form a second liquid chamber, the outer cylinder and the orifice ring further form an orifice path making the first liquid chamber and the second liquid chamber communicate with each other, and the first liquid chamber, the second liquid chamber and the orifice path are filled with liquid.

17 Claims, 17 Drawing Sheets

LIQUID-FILLED TYPE VIBRATION ISOLATING DEVICE AND MANUFACTURING METHOD THEREOF

TECHNICAL FIELD

The present invention relates to a liquid-filled type vibration isolator used for a suspension or an engine mount of an automobile and a manufacturing method thereof, particularly to an approximately cylindrical liquid-filled type vibration isolator that isolates a vibration along the axial direction and a manufacturing method thereof.

BACKGROUND OF THE INVENTION

Background Technology

There has been widely known a liquid-filled type vibration isolator that produces a damping force by a liquid filling inside of the isolator.

For example, in Japanese Patent Publication No.50135/1994, there is disclosed a liquid-filled type vibration isolator inside of which there is provided a pair of liquid chambers communicating with each other through an orifice path. With expansion and contraction of the liquid chamber induced by inputted vibration, the liquid flows in the orifice path to thereby produce the damping force.

The liquid-filled type vibration isolator is provided with an outer cylinder and an inner cylinder concentrically arranged inside the outer cylinder. Between the outer cylinder and the inner cylinder, the first fluid chamber, the second fluid chamber and the orifice path are formed by an approximately annular first rubber member, an approximately annular intermediate rubber member, and an approximately annular second rubber member. The first rubber member connects a first ring secured to an end of the outer cylinder and an outer periphery surface of an end of the inner cylinder. The intermediate rubber member connects a cylindrical first sleeve press fitted onto an outer periphery surface of the outer cylinder to be secured thereto and an orifice ring approximately U-shaped in cross section secured to an inner periphery surface of the outer cylinder. The second rubber member connects a second sleeve press fitted onto the other end of the inner cylinder to be secured thereto and the other end of the outer cylinder.

In thus constituted liquid-filled type vibration isolator, however, three kinds of molding tools are required for performing vulcanization molding of the first rubber member, the intermediate rubber member and the second rubber member, each with a different form. Along with this, the first sleeve and the second sleeve are required to be separately press fitted onto the inner cylinder. Thus, there arises problem of largeness in the number of parts that increases a cost and makes a production process complicated.

SUMMARY OF THE INVENTION

The present invention is of a liquid-filled type vibration isolator and a manufacturing method thereof provided for solving the above problem of largeness in the number of parts that increases the cost and makes the production process complicated.

The liquid-filled type vibration isolator according to the present invention is characterized by comprising an inner cylinder, a first ring being approximately L-shaped in cross section, a second ring, an orifice ring arranged between the first ring and the second ring, the orifice ring being approximately U-shaped in cross section, an elastic member of rubber material being cylinder-like, the elastic rubber member having an in-cylinder face integrally combining with the inner cylinder and an out-cylinder face integrally combining with the first ring, the orifice ring, and the second ring, and having a first groove formed on the out-cylinder face between the first ring and the orifice ring, and a second groove formed on the out-cylinder face between the orifice ring and the second ring, and an outer cylinder integrally combined with the first ring and the second ring, the outer cylinder and the first groove forming a first liquid chamber, the outer cylinder and the second groove forming a second liquid chamber, the outer cylinder and the orifice ring further forming an orifice path making the first liquid chamber and the second liquid chamber communicate with each other, and the first liquid chamber, the second liquid chamber and the orifice path being filled with liquid.

Such an integral molding of the inner cylinder, the first ring, the second ring, the orifice ring, and the elastic member reduces the number of parts assembled onto the outer cylinder to decrease the man-hours for assembly, which can lead to reduction in cost and improvement in productivity.

The present invention can provide a structure in which the outer cylinder has a plurality of protrusions on an inside surface thereof, the protrusions being made to engage with at least two of the first groove, the second groove, and the orifice ring to be caught thereby. The structure can be more preferably provided with a structure, in which a certain plurality of the protrusions are arranged in circle on an inside surface of the outer cylinder so that the protrusions are made to engage with one of the first groove, the second groove and the orifice ring to be caught thereby. This allows the first ring, the second ring, and the orifice ring to be easily assembled onto specified positions of the outer cylinder without causing any looseness, and ensures that a desired performance can be provided.

The protrusions are preferably arranged so as not to overlap with one another in an axial direction on an inside surface of the outer cylinder. This allows a plurality of the protrusions to be easily formed on the inner periphery surface of the outer cylinder which protrusions are separated in the axial direction of the outer cylinder and arranged along in the circumferential direction of the outer cylinder.

The liquid-filled type vibration isolator according to the present invention can provide a coating layer integrated with the elastic member in an inner face of the groove around the orifice ring with an inner bottom face opposite to the outer cylinder in the orifice path kept to be formed in a convex face approximately circular-arc-like in cross section.

This can reduce the cross sectional area of the orifice path by the shape of the convex face of the inner bottom face of the orifice path to enable the peak frequency of damping to be reduced. Along with this, change given in the cross sectional shape hardly causes turbulent flow in the orifice path to lessen a pressure loss near the entrance of the orifice path. This effectively increases a loss factor as a liquid-filled type vibration isolator.

In addition, a method of manufacturing a liquid-filled type vibration isolator according to the present invention is characterized by comprising the first step of molding an elastic member of cylinder-like rubber material having an in-cylinder face integrally combined with an inner cylinder and an out-cylinder face integrally combined with a first ring, an orifice ring, and a second ring, the elastic member having a first groove formed on the out-cylinder face between the first ring and the orifice ring, and a second groove formed on the out-cylinder face between the orifice ring and the second ring, the second step of forming a plurality of protrusions on an inner face of an outer cylinder, and the third step of assembling the elastic member and the outer cylinder in liquid. This allows the above-described liquid-filled type vibration isolator to be easily manufactured with less number of parts and less assembling man-hours.

In the above manufacturing method, the first step of molding the elastic member includes setting of the first ring, the orifice ring, the second ring, and the inner cylinder in a molding tool, and injection of the rubber material into the molding tool for integrally molding the elastic member together with these component members.

In addition, the second step of forming the protrusions includes setting of an inner mold inside the outer cylinder, setting of an outer mold around the outer cylinder, and an application of a specified force to the outer mold for forming the protrusions. Moreover, the inner mold is column-shaped with an outer diameter approximately equal to an inner diameter of the outer cylinder and has a plurality of depressions on an outer face thereof, and the outer mold is cylinder-shaped with an inner diameter approximately equal to an outer diameter of the outer cylinder and has a plurality of protrusions at positions corresponding to the respective depressions on the inner mold. This allows the outer cylinder having a plurality of the protrusions on the inner periphery surface to be easily manufactured.

In the above second step, the inner mold is constituted of an upper mold and a lower mold being divided from each other by a stepped parting line comprising line segments along a circumferential direction and line segments along an axial direction, the depressions are arranged on an outer face of the inner mold so as to be positioned on the parting line, and the outer mold is divided at equal intervals into a plurality of parts so that the outer mold can be radially disassembled. This allows the protrusions formed on the inner periphery surface of the outer cylinder to be easily formed on a portion where they are not overlapped with one another in the axial direction of the outer cylinder.

Furthermore, the third step of assembling the elastic member and the outer cylinder includes submergence of the outer cylinder with protrusions, and the elastic member integrally molded with the first ring, the second ring, the office ring and the inner cylinder in liquid, insertion of the elastic member into the outer cylinder, and combination of the outer cylinder with the first ring and the second ring for sealing.

Moreover, the method of manufacturing the liquid-filled type vibration isolator according to the present invention allows, in the first step of molding the elastic member, an inner periphery surface of a projected part of a mold to be subjected to cutting beforehand in concave approximately circular-arc-like in cross section, the projected part being for molding an inner face of a groove around the office ring, and the mold being for integrally molding the elastic member with the inner cylinder, the first ring, the second ring, and the orifice ring. This can make an inner bottom face opposite to the outer cylinder in an orifice path formed in a convex face approximately circular-arc-like in cross section. In addition, by adjusting the height of the convex face by the cutting, the cross sectional area of the orifice path can be adjusted to allow a peak frequency of damping to be adjusted for reduction. Furthermore, the inner periphery surface of the projected part being cut in concave approximately circular-arc-like in cross section allows a coating layer covering the orifice ring to be molded in being well balanced.

The molding tool comprises both of upper and lower molds molding the upper and lower faces of them, respectively, and a radially dividable intermediate mold provided between both of the upper and lower molds for molding outer periphery, the intermediate mold being to be provided with the projected part on an inner periphery thereof for molding the inner face of the groove around the office ring, and the inner periphery surface of the projected part being subjected to cutting in concave approximately circular-arc-like in cross section for making an inner bottom face of an orifice path to be formed in convex approximately circular-arc-like in cross section, the inner bottom face being opposite to the outer cylinder.

DETAILED DESCRIPTION OF THE PREFERRED EMBODIMENTS

An embodiment of the present invention will be explained in detail on the basis of drawings.

FIG. 1 through FIG. 18 show the first example of a liquid-filled type vibration isolator according to the present invention. The vibration isolator 2 is constituted so that it has a pair of liquid chambers therein which communicate with each other through an orifice path and, with expansion and contraction of the liquid chambers induced by an inputted vibration, liquid flows in the orifice path to thereby produce a damping force.

As shown in FIG. 1 through FIG. 4, the liquid-filled type vibration isolator 2 has a metal inner cylinder 4, on the outer periphery side of which there is provided a metal outer cylinder 6. At an upper end of the outer cylinder 6, there is formed a flange 8 along in the radial direction of the outer cylinder 6.

Figure 3:
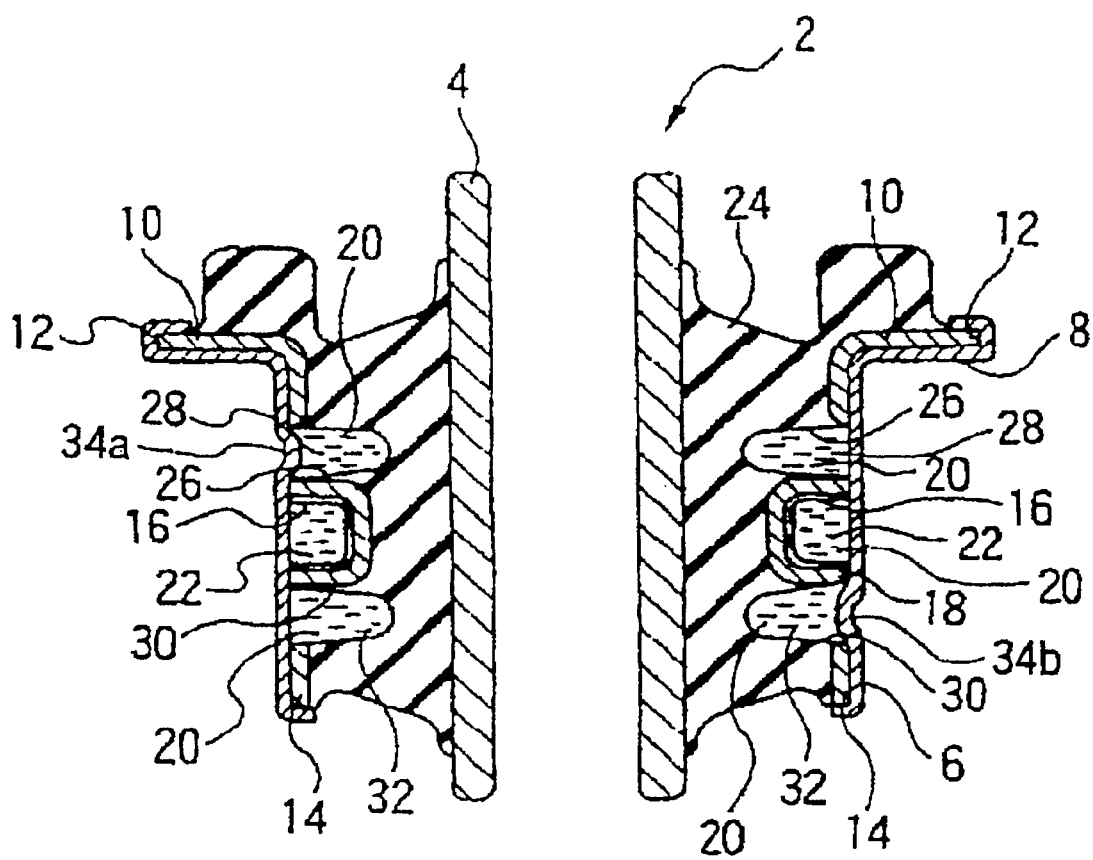
FIG. 3 is a cross sectional view taken along line III—III in FIG. 1.

At an end on the side of the flange 8 of the outer cylinder 6, a first ring 10, made of metal and presented in L-shaped in cross section, is secured. An edge 12 of the first ring, shown above in FIG. 3, is caulked to be secured by an outer periphery edge of the flange 8. At an end of the outer cylinder 6, shown below in FIG. 3, a second ring 14 made of metal is secured. An end of the second ring, shown below in FIG. 3, is caulked to be secured by the lower end of the outer cylinder 6.

Furthermore, between the first ring 10 and the second ring 14, there is arranged an orifice ring 18 made of metal. The orifice ring 18 is approximately channel-like in cross section or approximately U-shaped in cross section with a groove opened on the outer periphery side around the orifice ring 18, and is secured onto the inner periphery surface of the outer cylinder 6. The orifice ring 18 forms an annular orifice path 22, filled with liquid 20 inside thereof and provided along the circumferential direction of the outer cylinder 6, by the groove 16 and the inner periphery surface of the outer cylinder 6. The orifice ring 18 is formed by, for example, stamping out from a metal sheet an annular members having a through hole at the center thereof, raising an inner periphery side of the annular member over the whole periphery into an approximate L-shape in cross section, and preparing a pair of thus formed annular members to make them butt at each other for being welded.

Inner periphery surfaces of the first ring 10, the second ring 14 and the orifice ring 18, and the outer periphery surface of the inner cylinder 4 are combined by an elastic member 24 made of approximately cylinder-like rubber material. Namely, the inner periphery surfaces of the first ring 10, the second ring 14 and the orifice ring 18 are combined with the out-cylinder face of the elastic member 24 by vulcanization bonding. Further, the outer periphery surface of the inner cylinder 4 is combined with the in-cylinder face of the elastic member 24 by the vulcanization bonding.

Around the out-cylinder face of the elastic member 24 between the first ring 10 and the orifice ring 18, there is formed a first groove 26. By the first groove 26 and the inner periphery surface of the outer cylinder 6, there is formed an annular second liquid chamber 28 filled with the liquid 20.

In addition, around the out-cylinder face of the elastic member 24 between the second ring 14 and the orifice ring 18, there is formed a second groove 30. By the second groove 30 and the inner periphery surface of the outer cylinder 6, there is formed an annular second liquid chamber 32 filled with the liquid 20.

Figure 5:
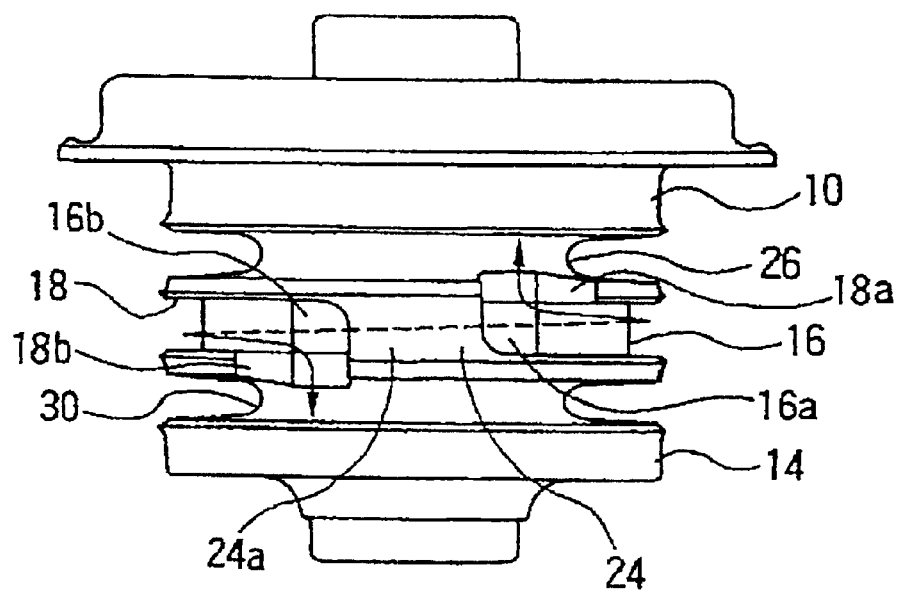
FIG. 5 is a side view of a molded form in which an elastic member is integrally molded with a first ring, a second ring, an orifice ring, and an inner cylinder.

Moreover, the groove 16 around the orifice ring 18 is blocked by a portion 24a of the elastic member 24 as shown in FIG. 5. At one end 16a of both ends of the groove 16 which ends are formed by the blocked portion 24a, a section 18a of the orifice ring 18 is cut out to make the groove 16 communicate with the first groove 26. Along with this, at the other end 16b, a section 18b of the orifice ring 18 is cut out to make the groove 16 communicate with the second groove 30. Namely, the first liquid chamber 28 and the second liquid chamber 32 communicate with each other approximately in spiral through the orifice path 22. This makes the liquid 20 flow along the circumferential direction of the outer cylinder 6 between the first liquid chamber 28 and the second liquid chamber 32 as shown by arrows in FIG. 5.

On the inner periphery surface of the outer cylinder 6, there are formed a plurality of approximately rectangular protrusions 34 which are separated from one another in the axial direction of the outer cylinder 6 and made protruded toward the axis of the outer cylinder 6. The protrusions 34 are provided so that they engage with at least two of the first groove 26, the second groove 30, and the orifice ring 18.

Figure 1:
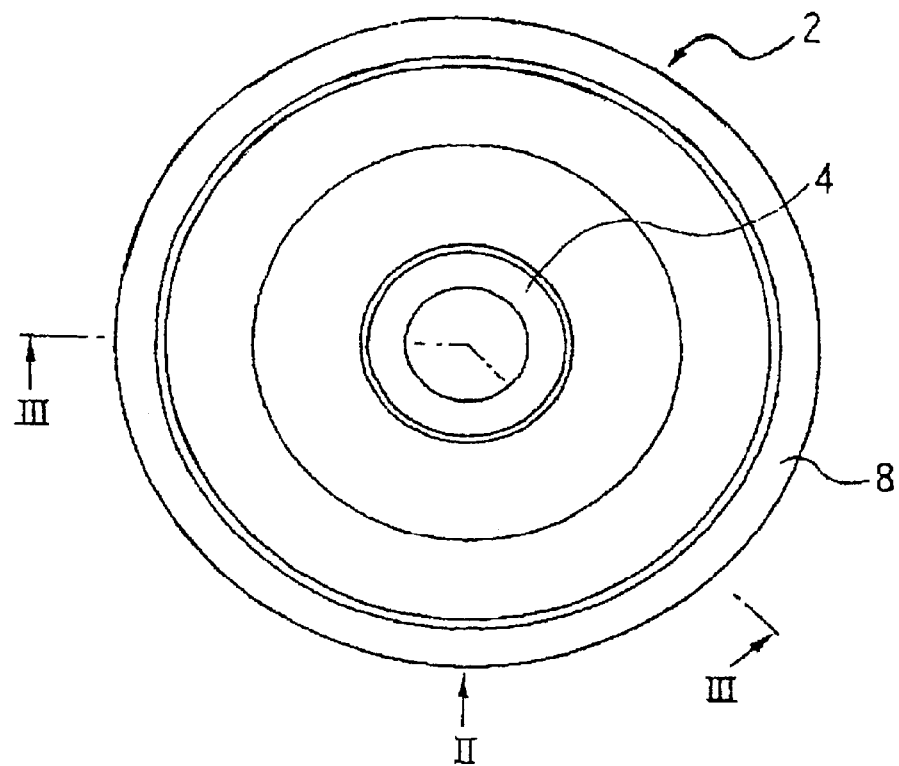
FIG. 1 is a plan view of a liquid-filled type vibration isolator according to the present invention.
Figure 2:
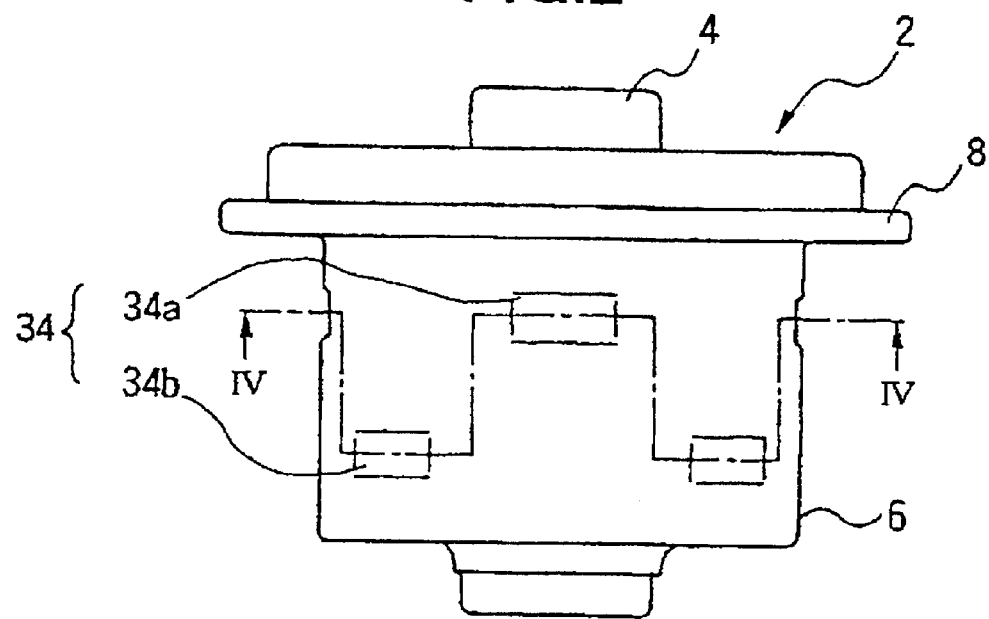
FIG. 2 is a side view taken in the direction of the arrow A in FIG. 1.
Figure 4:
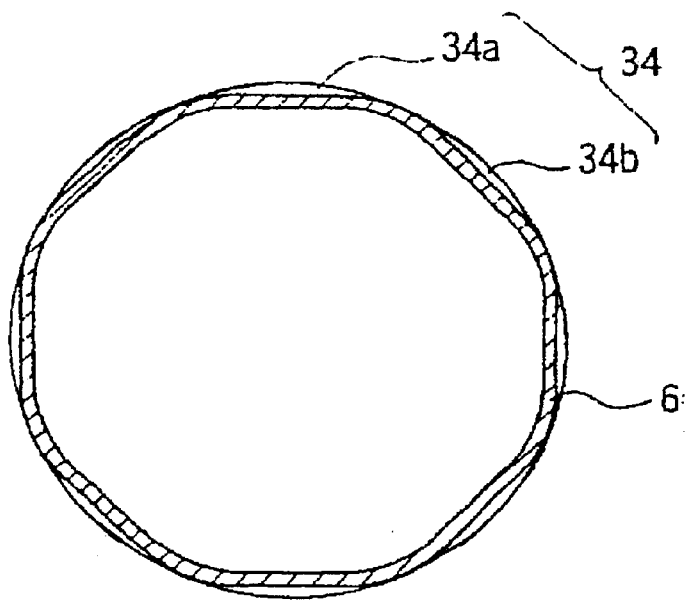
FIG. 4 is a cross sectional view taken along line IV—IV in FIG. 2.

Namely, on the inner periphery surface of the outer cylinder 6, there are formed protrusions 34a which engage with four positions along the circumferential direction of the first groove 26, respectively, and are separated from one another in the circumferential direction. Moreover, there are formed protrusions 34b which engage with four positions along the circumferential direction of the second groove 30, respectively, and are separated from one another in the circumferential direction. The protrusions 34a, engaging with the first groove 26, contact with the first ring 10 and the orifice ring 18. While, the protrusions 34b, engaging with the second groove 30, contact with the orifice ring 18 and the second ring 14. The protrusions 34a and the protrusions 34b are, as shown in FIG. 2 and FIG. 4, formed so as not to overlap with one another in the axial direction of the outer cylinder 6. The protrusions 34 are formed by denting the outer periphery surface of the outer cylinder 6.

Next to this, a method of manufacturing the liquid-filled type vibration isolator 2 will be explained.

Figure 6:
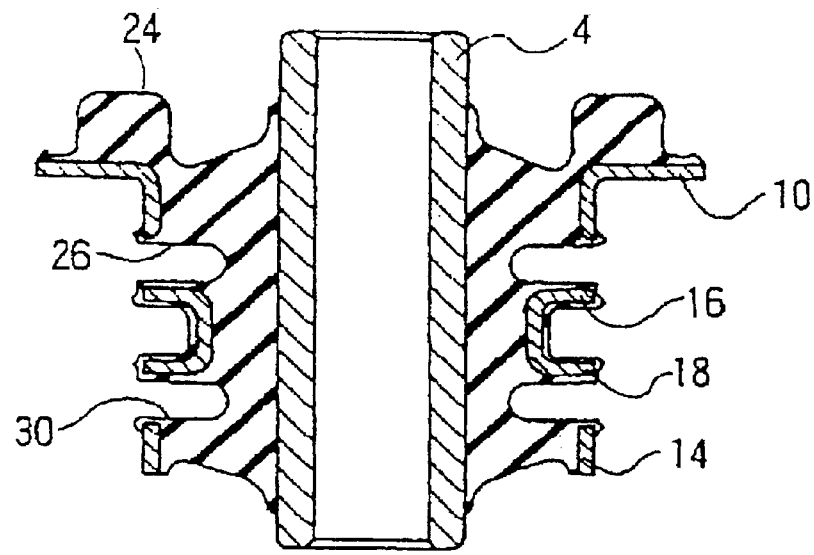
FIG. 6 is a vertical cross sectional view of the molded form in FIG. 5.

In the first step, the inner cylinder 4, the first ring 10, the second ring 14, and the orifice ring 18 are set in an unillustrated molding tool. The first ring 10 and the second ring 14 are arranged on the outer periphery side of the inner cylinder 4 so as to be kept separated from each other. The orifice ring 18 is arranged on the outer periphery side of the inner cylinder 4 between the first ring 10 and the second ring 14 so as to be kept separated therefrom, with the groove 16, opening toward the outer periphery side thereof, formed in the circumferential direction. Then, the rubber material is injected into the mold tool for vulcanization molding. With this, as shown in FIG. 6, the approximately cylinder-like elastic member 24 is integrally molded which combines the outer periphery surface of the inner cylinder 4 and the inner periphery surfaces of the first ring 10, the second ring 14, and the orifice ring 18. At the same time, at the out-cylinder surface of the elastic member 24, the first groove 26 and the second groove 30 are simultaneously formed in the molding tool. The first groove 26 is formed in annular between the first ring 10 and the orifice ring 18, and continues to the groove 16 around the orifice ring 18. The second groove 30 is formed in annular between the second ring 14 and the orifice ring 18, and continues to the groove 16 around the orifice ring 18.

Figure 7:
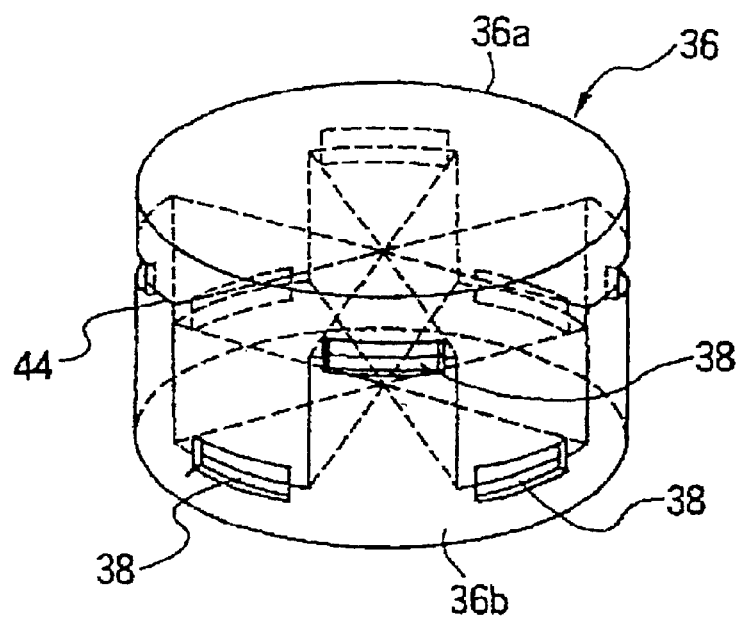
FIG. 7 is a perspective view of an inner mold for molding an outer cylinder.
Figure 8:
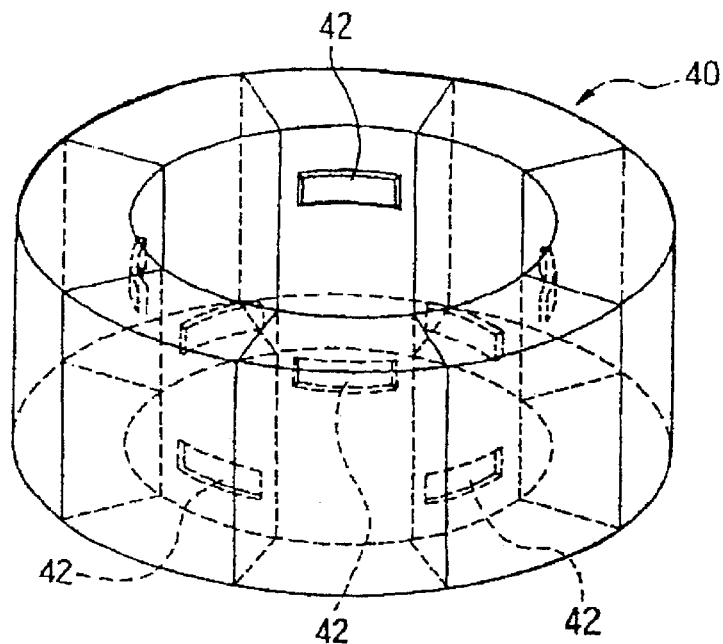
FIG. 8 is a perspective view of an outer mold for molding the outer cylinder.

Meanwhile, in the second step, by using an inner mold 36 shown in FIG. 7 and an outer mold 40 shown in FIG. 8, a plurality of the protrusions 34 are formed in the inner face of the outer cylinder 6.

The inner mold 36 has an outer diameter approximately equal to the inner diameter of the outer cylinder 6 having an inner diameter larger than outer diameters of the first ring 10, the second ring 14, and the orifice ring 18. It is shaped in approximately column-like with rectangular depressions 38 formed at eight positions on the outer periphery surface thereof. The outer mold 40 has an inner diameter approximately equal to the outer diameter of the outer cylinder 6, and is shaped in approximately in cylinder-like with projections 42 formed on the inner periphery surface at positions corresponding to those of the depressions 38, respectively. The projection 42 has a size allowing the protrusion 42 to be nested in the depression 38. By using such molds with the inner mold 36 inserted inside the outer cylinder 6 and, along with this, with the outer mold 40 set outside, clamping of the outer cylinder 6 is carried out to form the protrusions 34 on the inner periphery surface of the outer cylinder 6.

The inner mold 36 is, as shown in FIG. 7, divided into an upper mold 36a and a lower mold 36b so that a stepped parting line 44, comprising line segments along the circumferential direction and line segments along the axial direction, is formed on the outer periphery surface thereof. Across the parting line 44 along the circumferential direction of the inner mold 36, the depressions 38 are formed on the outer periphery of the inner mold 36.

Figure 9:
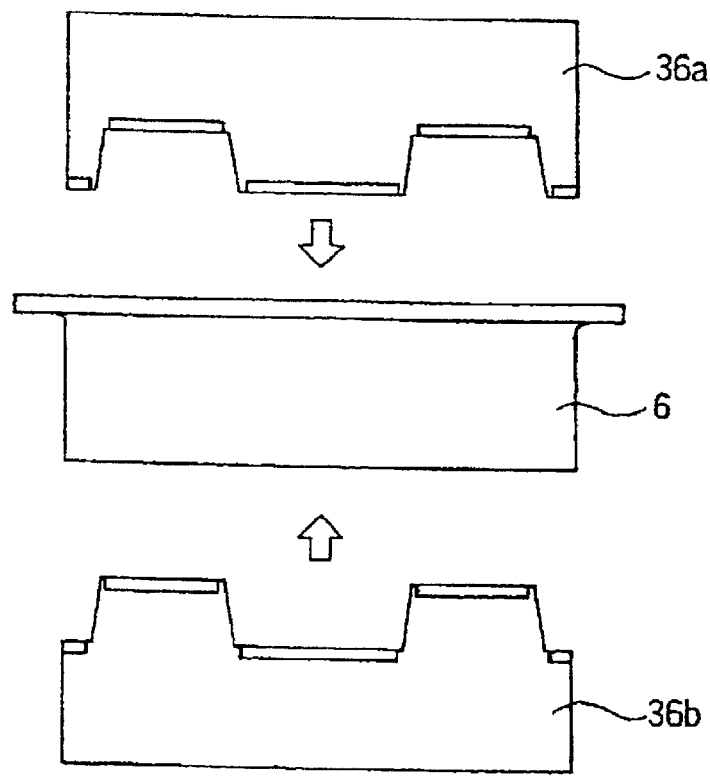
FIG. 9 is a side view showing a method of inserting the inner mold into the outer cylinder.

Then, as shown by arrows in FIG. 9, the upper mold 36a is inserted from one end of the outer cylinder 6, and the lower mold 36b is inserted from the other end of the outer cylinder 6.

Meanwhile, the outer mold 40 is, as shown in FIG. 8, divided at equal intervals into eight equal parts in the circumferential direction by planes including the axis of the outer mold 40 so that it can be radially disassembled. With this, the outer cylinder 6 is radially clamped after the inner mold 36 is inserted into the outer cylinder 6.

Figure 10:
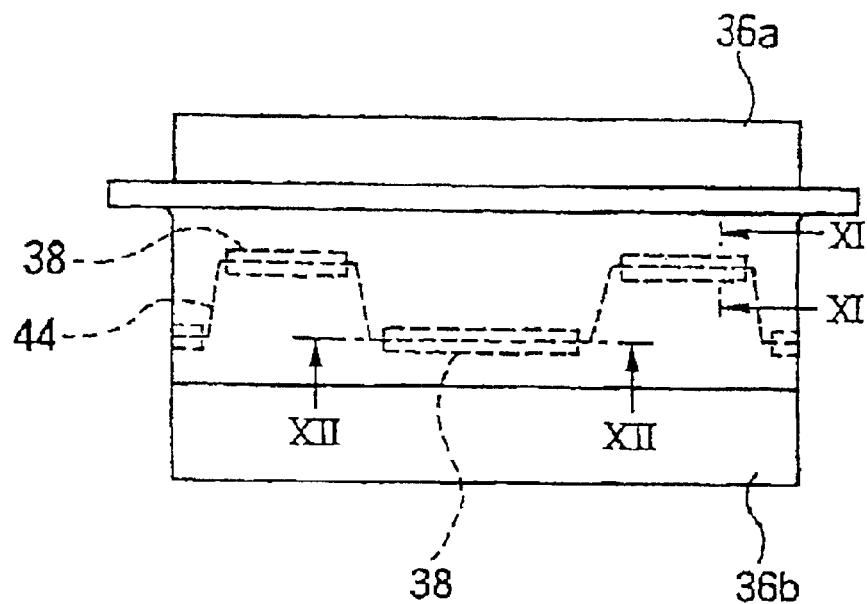
FIG. 10 is a side view of the inner mold in a state with the outer mold being set.
Figure 11:
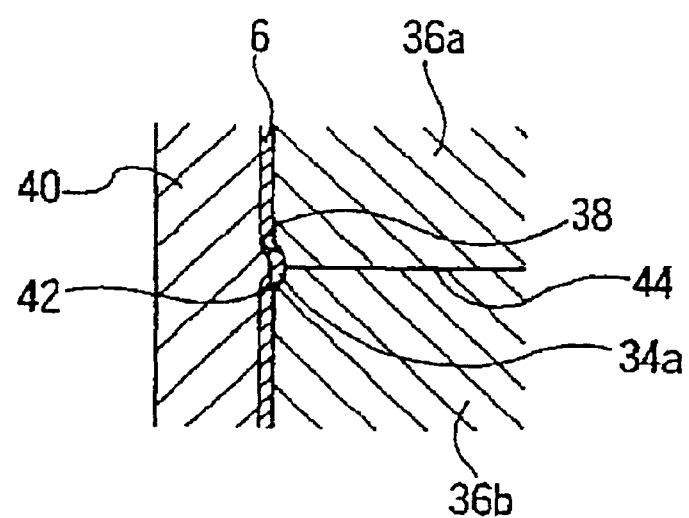
FIG. 11 is a cross sectional view taken along line XI—XI in FIG. 10.
Figure 12:
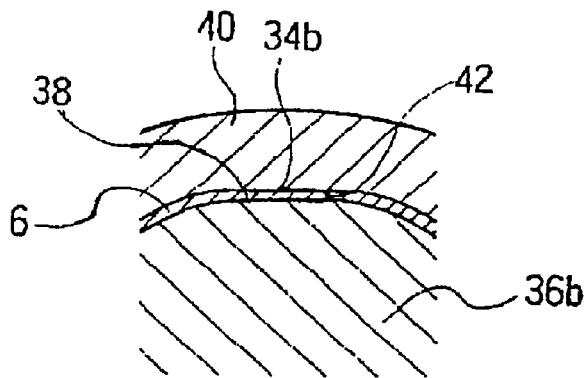
FIG. 12 is a cross sectional view taken along line XII—XII in FIG. 10.

FIG. 10 shows a state in which the outer cylinder 6 is being clamped. At this time, as shown in FIG. 11 and FIG. 12, by the depressions 38 on the inner mold 36 and the projections 42 on the outer mold 40, the protrusions 34 are formed on the inner periphery surface of the outer cylinder 6.

Figure 13:
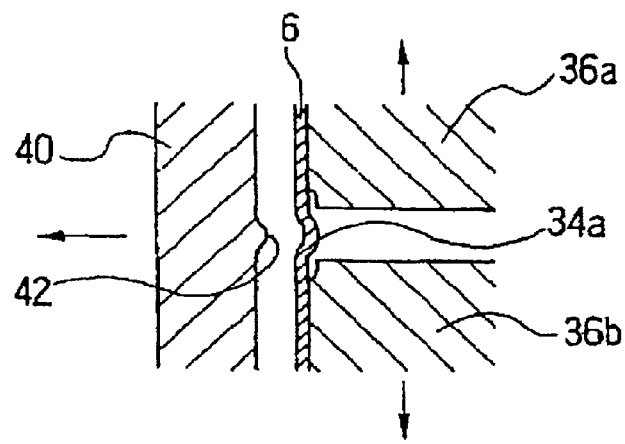
FIG. 13 is a cross sectional view at mold release in FIG. 11.
Figure 14:
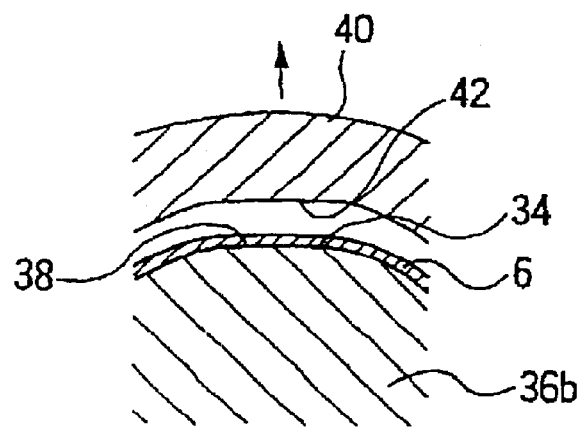
FIG. 14 is a cross sectional view at mold release in FIG. 12.

On completion of the clamping, as shown by arrows in FIG. 13 and FIG. 14, each of the upper mold 36a and the lower mold 36b of the inner mold 36 is drawn out in the axial direction of the outer cylinder 6. In addition, the outer mold 40 is drawn back in the radial direction of the outer cylinder 6. Thus, mold release is carried out.

Figure 15:
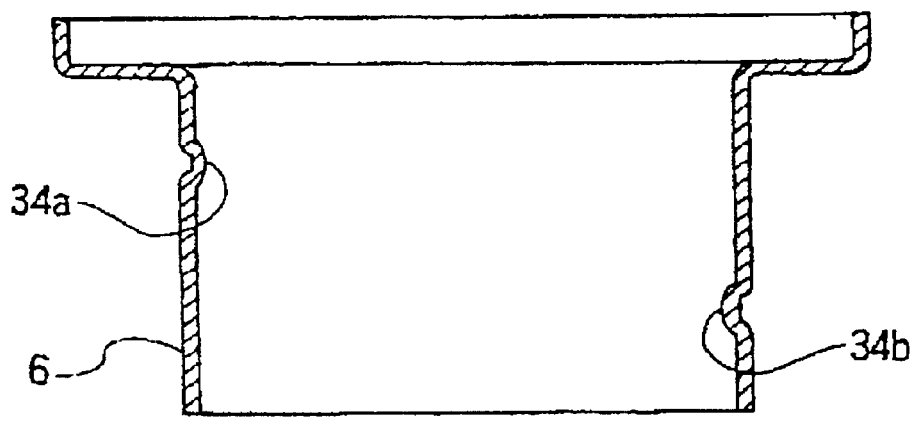
FIG. 15 is a cross sectional view of the outer cylinder with protrusions formed.

In such a way, in the second step, as shown in FIG. 15, the outer cylinder 6 is formed with the protrusions 34a and 34b formed so as to be separated from one another in the axial direction and not to overlap with one another in the axial direction.

Figure 16:
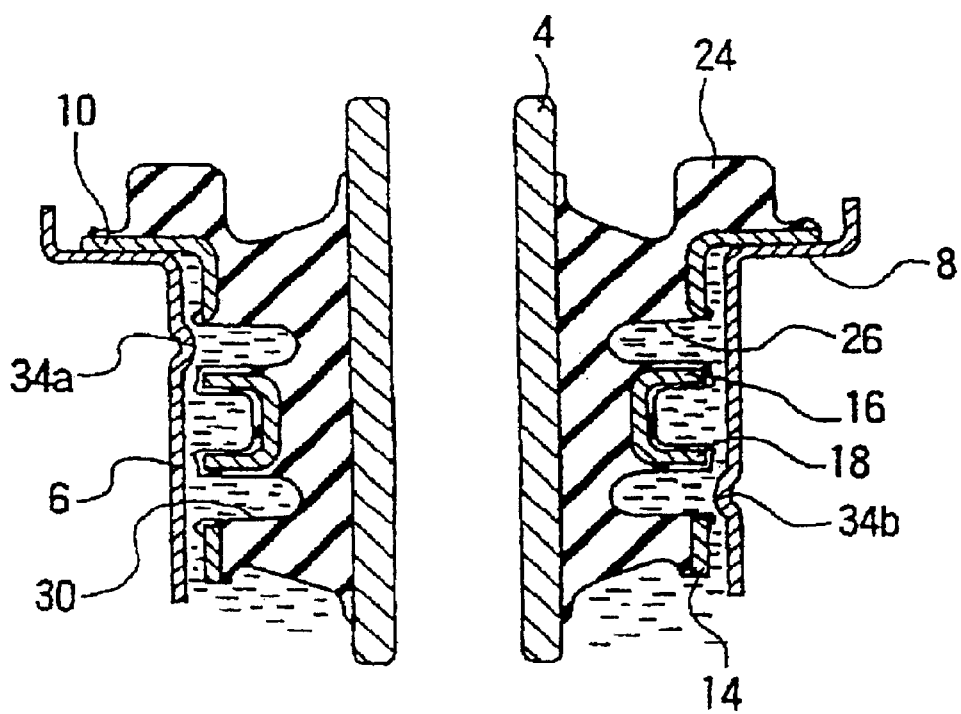
FIG. 16 is a cross sectional view of a state with the molded form of the elastic member being inserted into the outer cylinder in liquid.
Figure 17:
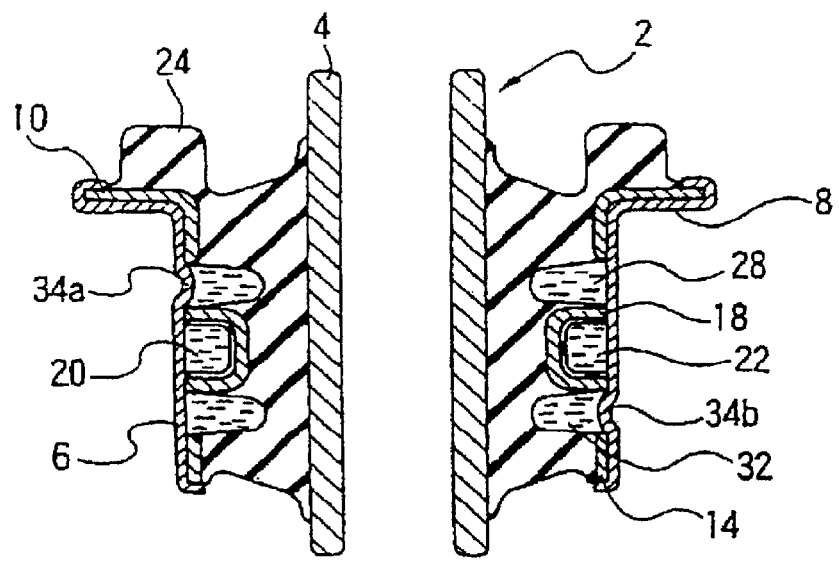
FIG. 17 is a cross sectional view of a state with the outer cylinder being assembled onto the molded form of the elastic member in liquid for sealing.

Furthermore, in the third step, as shown in FIG. 16, into the outer cylinder 6, there is inserted in liquid a molded form of the elastic member 24 molded in the first step. The outer cylinder 6 has the protrusions 34 (34a and 34b) formed in the second step at a plurality of positions on the inner periphery surface thereof. Then, as shown in FIG. 17, by compressing the outer cylinder 6 to reduce its diameter, the molded form of the elastic member 24 and the outer cylinder 6 are assembled, with the liquid 20 being sealed in the first liquid chamber 28 between the first groove 26 and the inner periphery surface of the outer cylinder 6, the second liquid chamber 32 between the second groove 30 and the inner periphery surface of the outer cylinder 6, and the orifice path 22 between the groove 16 around the orifice ring 18 and the inner periphery surface of the outer cylinder 6. At the assembling, the outer cylinder 6 is caught to be positioned, with the protrusions 34a on the inner periphery surface engaging with the first groove 26, and the protrusions 34b engaging with the second groove 30. Further, the upper edge 12 of the first ring 10 is caulked by the outer peripheral rim of the flange 8 of the outer cylinder 6, and the lower end of the second ring 14 is caulked by the lower end of the outer cylinder 6 to bring the liquid-filled type vibration isolator 2 to completion.

In such a liquid-filled type vibration isolator 2, the inner cylinder 4, the first ring 10, the second ring 14, and the orifice ring 18 are integrally molded with the elastic member 24 by means of insert molding. That is, only one kind of the molding tool is necessary for molding the elastic member 24 to allow cost reduction. In addition, the inner cylinder 4, the first ring 10, the second ring 14, the orifice ring 18, and the elastic member 24, being integrated when assembled onto the outer cylinder 6, necessitate a small number of parts. This can reduce man-hours in assembling to allow improvement in productivity.

Moreover, the first ring 10 is assembled onto a specified position on the outer cylinder 6 by the protrusions 34a engaging with the first groove 26 and the flange 8 of the outer cylinder 6. The second ring 14 is assembled onto a specified position on the outer cylinder 6 by the protrusions 34b engaged with the second groove 30 and by the outer cylinder 6. The orifice ring 18 is assembled onto a specified position on the outer cylinder 6 by the protrusions 34a engaging with the first groove 26 and by the protrusions 34b engaging with the second groove 30. That is, this ensures axial positioning of the first ring 10, the second ring 14, and the orifice ring 18 to further permit to prevent looseness from occurring in the axial direction. Thus, the liquid-filled type vibration isolator 2 can be ensured to exhibit the desired performance thereof.

Figure 18:
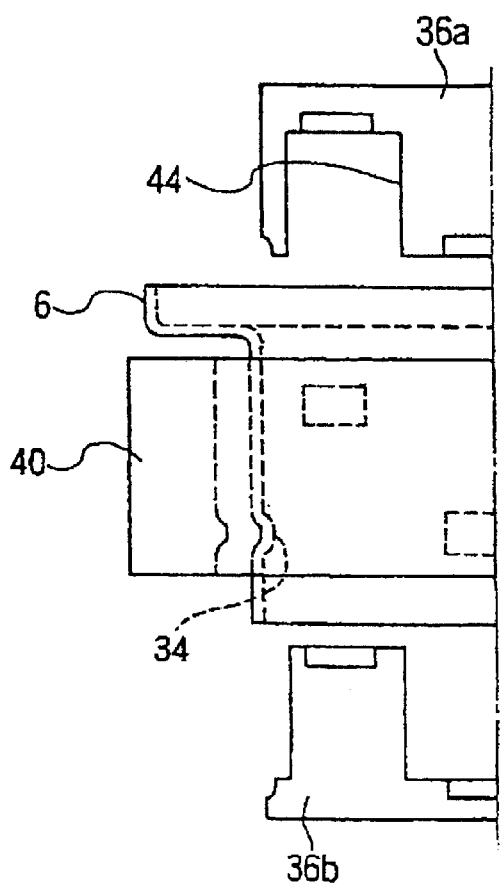
FIG. 18 is a halved cross sectional view showing a state of releasing the outer cylinder from an outer mold and an inner mold.

Furthermore, the protrusions 34a and 34b are formed so as not to overlap with one another in the axial direction of the outer cylinder 6. For that, the inner mold 36 is divided so that the stepped parting line 44, comprising line segments along the circumferential direction and line segments along the axial direction, is formed on the outer periphery surface thereof. Further, the depressions 38 are formed so that they are provided across the parting line 44 along the circumferential direction. By using such an inner mold 36, as shown in FIG. 18, with a simple mold structure comprising the upper mold 36a and the lower mold 36b, a plurality of protrusions 34, separated from one another in the axial direction and provided along the circumferential direction, can be easily formed on the inner periphery surface of the outer cylinder 6. Along with this, the upper mold 36a and the lower mold 36b can be easily released from the outer cylinder 6 along the axial direction of the outer cylinder 6.

The depressions 38 formed on the inner mold 36 are not necessarily formed across the parting line 44, but may be formed so that the parting line 44 is fitted along the opened edges of the depressions 38.

Figure 19:
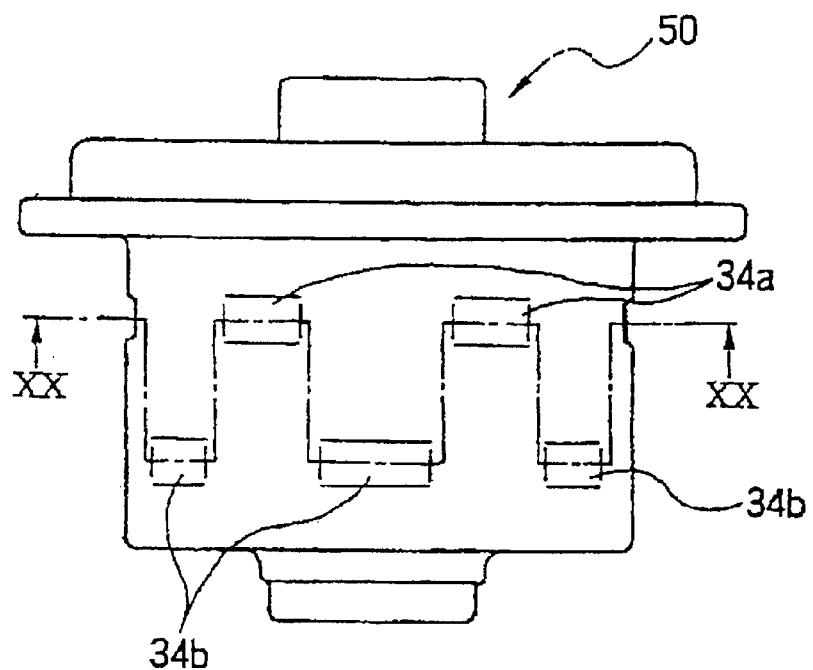
FIG. 19 is a side view of a liquid-filled type vibration isolator in the second example according to the present invention.
Figure 20:
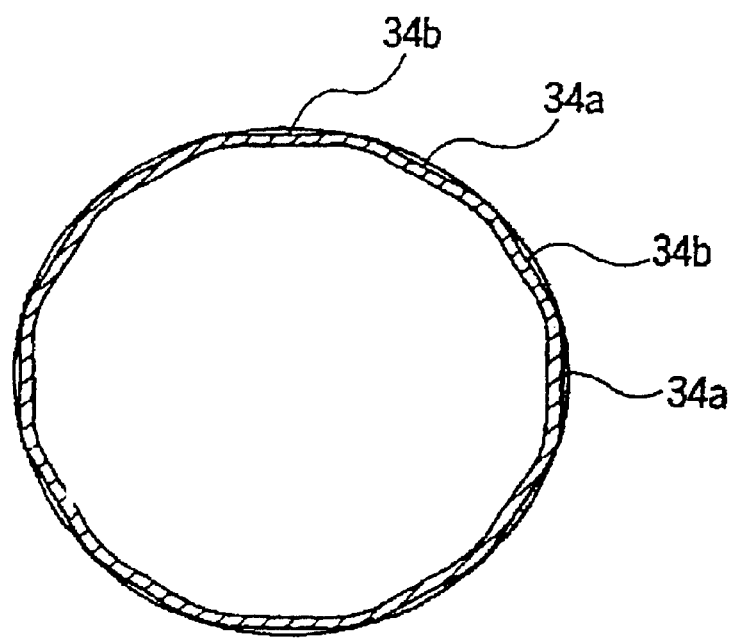
FIG. 20 is a cross sectional view of the outer cylinder taken along line XX—XX in FIG. 19.

FIG. 19 and FIG. 20 show a liquid-filled type vibration isolator 50 of a second example according to the present invention. In the example, the same constituents as those in the first example are denoted by the same reference numerals and characters with the explanation thereof to be omitted.

In the liquid-filled type vibration isolator 50, as shown in FIG. 19 and FIG. 20, six upper side protrusions 34a and six lower side protrusions 34b are formed on the inner periphery surface of the outer cylinder 6 so as to be separated from one another in the circumferential direction. The upper side protrusions 34a engage with the first groove 26 and the lower side protrusions 34b engage with the second groove 30. When combining the molded form of the elastic member 24 with the outer cylinder 6, the positioning can be performed with the upper six protrusions 34a, provided on the inner periphery of the outer cylinder 6, engaging with the first groove 26 and the lower six protrusions 34b engaging with the second groove 30. A method of manufacturing the liquid-filled type vibration isolator 50 can be carried out basically in the same way as that in the first embodiment only by changing the number of the protrusions 34 formed on the inner periphery surface of the outer cylinder 6.

In thus constituted liquid-filled type vibration isolator 50 according to the second example, the protrusions 34, being provided with a larger total number than that in the first example, offer an advantage in preventing the first ring 10, the second ring 14 and the orifice ring 18 from causing axial looseness. In designing the outer cylinder 6, the number and the magnitude of protrusion of the protrusions 34 are designed with a balance of assembling taken into consideration. Thus, for an increased number of the protrusions 34, less magnitude of protrusion is necessary.

Figure 21:
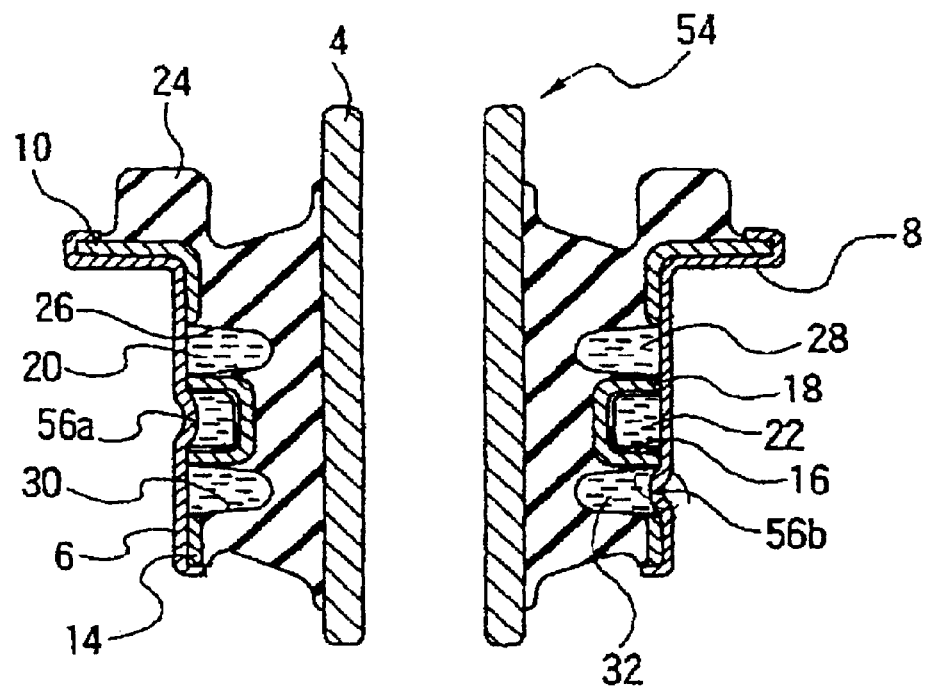
FIG. 21 is a cross sectional view of a liquid-filled type vibration isolator in the third example according to the present invention.
Figure 22:
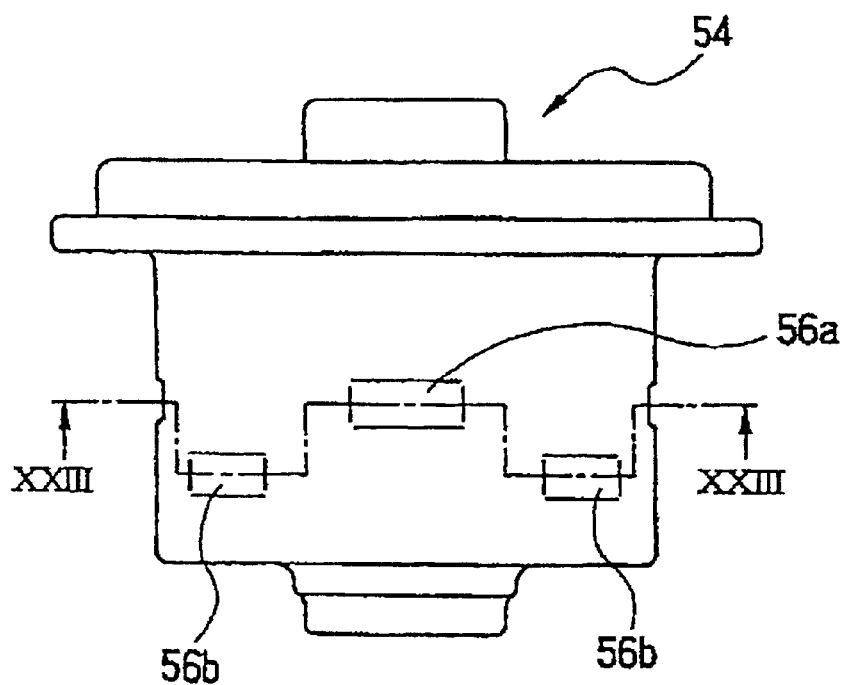
FIG. 22 is a side view of the liquid-filled type vibration isolator in the third example.
Figure 23:
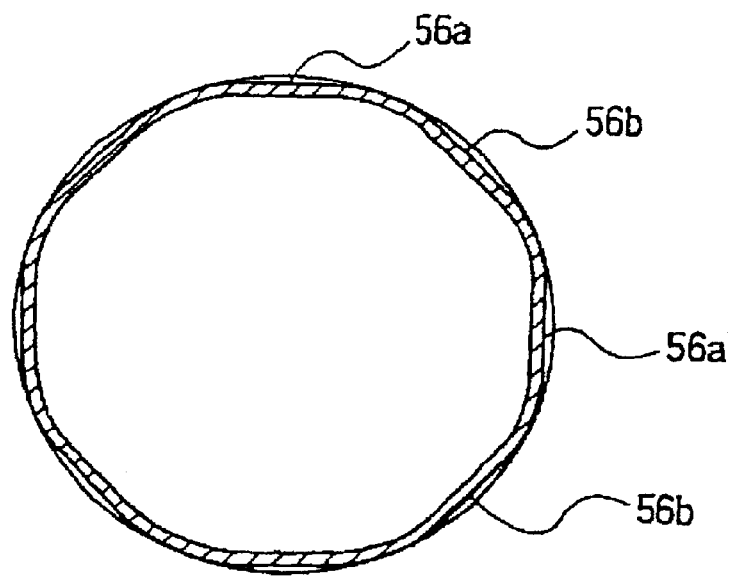
FIG. 23 is a cross sectional view of the outer cylinder taken along line XXIII—XXIII in FIG. 22.

FIG. 21 through FIG. 23 show a liquid-filled type vibration isolator 54 of a third example according to the present invention. In the example, the same constituents as those in the first example are denoted by the same reference numerals and characters with the explanation thereof to be omitted.

In the liquid-filled type vibration isolator 54, as shown in FIG. 22 and FIG. 23, four upper side protrusions 56a and four lower side protrusions 56b are formed on the inner periphery surface of the outer cylinder 6. The upper side protrusions 56a engage with the groove 16 around the orifice ring 18 and the lower side protrusions 56b engage with the second groove 30. The protrusions 56a, engaging with the groove 16, contact with opened edges of the orifice ring 18. While, the protrusions 56b, engaging with the second groove 30, contact with the orifice ring 18 and the second ring 14.

Also about the liquid-filled type vibration isolator 54 in the example, by changing the positions of the protrusions 56a and 56b formed on the inner periphery surface of the outer cylinder 6, the isolator 54 can be manufactured basically in the same way as that of the above-described first example. Moreover, by inserting a molded form by the elastic member 24 into the outer cylinder 6 in liquid and by compressing the outer cylinder 6 to reduce the diameter thereof, they can be assembled into a state of being filled with the liquid 20 inside. At this time, the outer cylinder 6 is positioned by the protrusions 56a on the inner periphery surface engaging with the groove 16 around the orifice ring 18, and by the protrusions 56b engaging with the second groove 30.

The liquid-filled type vibration isolator is used by setting it between two members for reducing transmission of vibration between the two members. At this time, the liquid-filled type vibration isolator is assembled onto one of the members by press fitting the outer cylinder 6 of the isolator into the one of the members. At the press fitting, in a liquid-filled type vibration isolator having the flange 8 as in the above example, the press fitted portion is often taken as a specified length in the axial direction on the outer periphery surface of the outer cylinder 6 which surface continues to the flange 8. Therefore, the protrusions 56a and 56b, formed on the side of the inner periphery surface of the press fitted and held portion, are provided as depressions on the side of the outer periphery surface of the outer cylinder 6. Such depressions increase a force for the press fitting due to subtle deformations around the depressions, or reduce an area of contact to lower a pull out force.

That is, in thus constituted liquid-filled type vibration isolator 54 in the third example, the position of the first ring 10 is also determined by the flange 8. This provides approximately the same axial stability for the first ring 10, the second ring 14, and the orifice ring 18 as that in the above the first example. In addition, the inner periphery surface of the outer cylinder 6 facing the first liquid chamber 28 in proximity to the flange 8, being formed with no protrusions 56, facilitates assembling of the isolator onto the mating member. Along with this, reduction in a pull out force can be prevented when assembling the liquid-filled type vibration isolator 54 onto the mating member.

Figure 24:
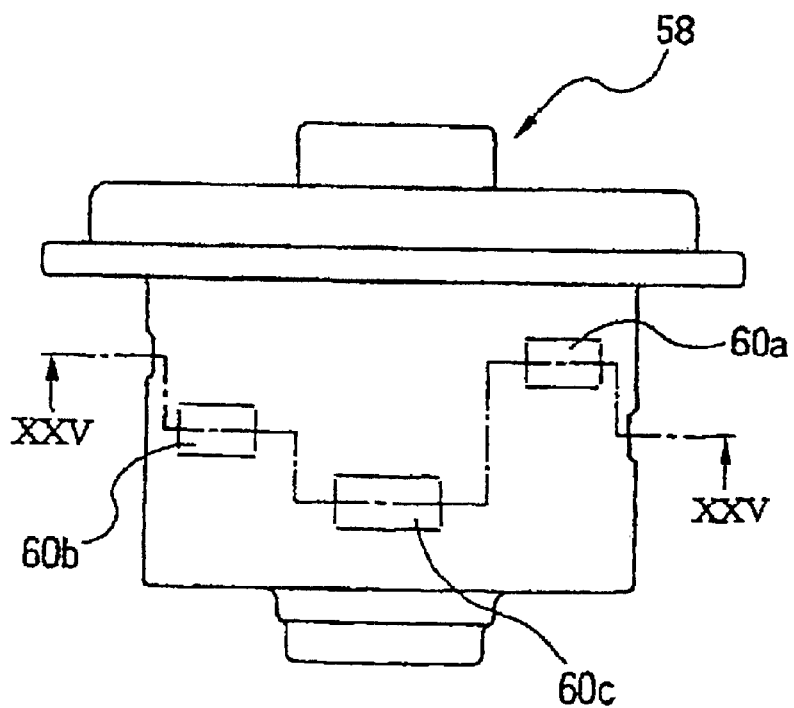
FIG. 24 is a side view of a liquid-filled type vibration isolator in the fourth example according to the present invention.
Figure 25:
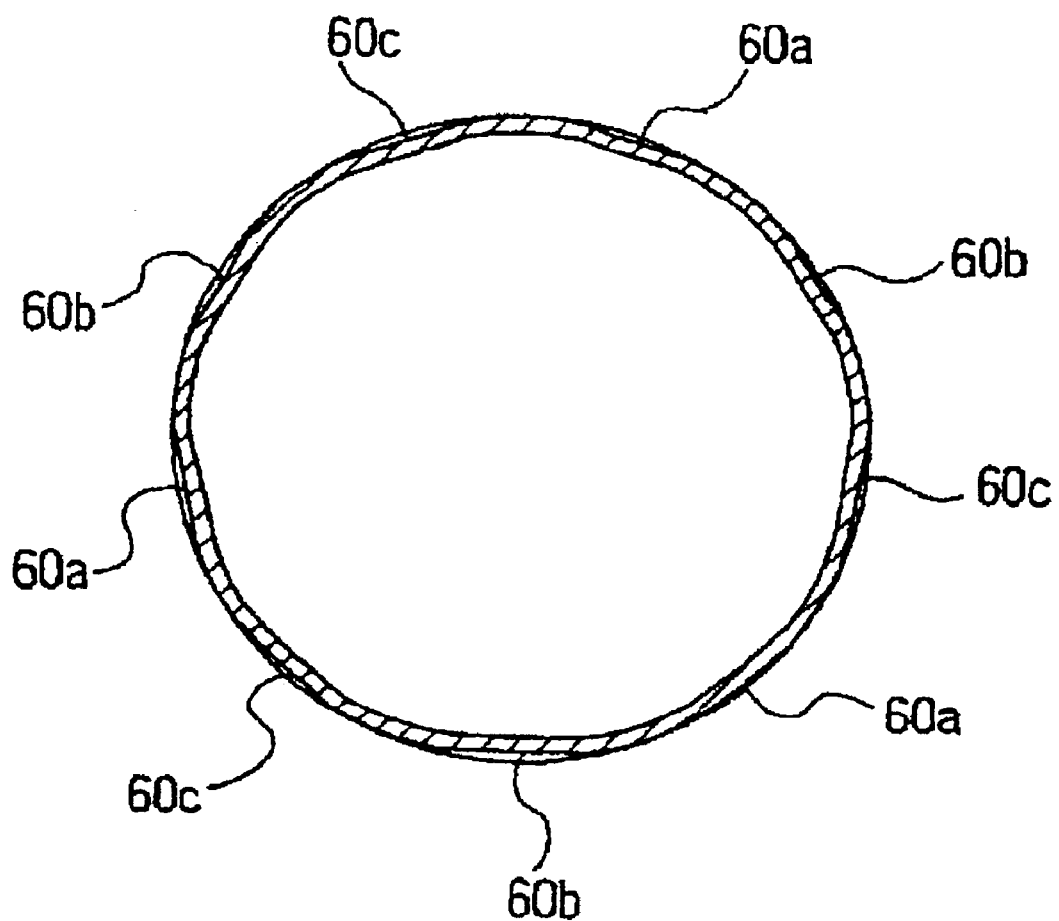
FIG. 25 is a cross sectional view of the outer cylinder taken along line XXV—XXV in FIG. 24.

FIG. 24 and FIG. 25 show a liquid-filled type vibration isolator 58 of a fourth example according to the present invention. In the example, the same constituents as those in the first example are denoted by the same reference numerals and characters with the explanation thereof to be omitted.

In the liquid-filled type vibration isolator 58, three protrusions 60a, three protrusions 60b and three protrusions 60c are formed on the inner periphery surface of the outer cylinder 6. The protrusions 60a, 60b, and 60c engage with the first groove 26, the second groove 30, and the groove 16 around the orifice ring 18, respectively. Also the vibration isolator 58 can be manufactured basically in the same way as that in the first embodiment. When inserting a molded form of an elastic member into the outer cylinder 6 for being combined thereto in liquid, the outer cylinder 6 is positioned by the protrusions 60a, 60b, and 60c on the inner periphery of the outer cylinder 6 engaging with the first groove 26, the groove 16 around the orifice ring 18, and the second groove 30, respectively.

In thus constructed liquid-filled type vibration isolator 58 of the fourth example, in three places in the axial direction of the outer cylinder 6, there are formed the protrusions 60 (60a, 60b, 60c). This allows the first ring 10, the second ring 14, and the orifice ring 18 to be combined onto respective specified positions in being well balanced, which can effectively prevent axial looseness from occurring.

Here, the outer diameter of the outer cylinder 6 is not necessarily provided to be the same along the axial direction of the outer cylinder 6. By forming an end side where the flange 8 is formed so as to provide a diameter a little larger than that of the other end side, productivity in, for example, being combined onto an engine mount can be improved.

FIG. 26 through FIG. 31 show a liquid-filled type vibration isolator 62 of a fifth example according to the present invention. In the example, the same constituents as those in the first example are denoted by the same reference numerals and characters with the explanation thereof to be omitted.

The liquid-filled type vibration isolator 62 is provided with a coating layer 64 made of rubber material integrated with the elastic member 24 in the inner side face of the groove 16 around the orifice ring 18. Along with this, an inner bottom face opposite to the outer cylinder 6 in the orifice path 22 is formed in a convex face 22a approximately circular-arc-like in cross section along the axial direction. The convex face 22a in the inner bottom face is not necessarily a continuous one over the whole length of the orifice path 22, but may be partly discontinuous. Moreover, for reducing a pressure loss when the filling liquid 20 flows, the convex face 22a is preferably formed except for portions near the entrances of the orifice path 22.

The convex face 22a of the inner bottom face in the orifice path 22 is formed as measures for adjusting the cross sectional area of the orifice path 22 in compliance with a characteristic to be obtained, as necessary.

The liquid-filled type vibration isolator 62 is manufactured basically in the same way as that in the above-described first example. Particularly in the example, however, in the first step of molding the elastic member 24 made of rubber material, of a molding tool 70, which is for integrally molding the elastic member 24 with the inner cylinder 4, the first ring 10, the second ring 14, and the orifice ring 18, an inner periphery surface of a projected part 72, which is for molding the coating layer 62 on the inner face of the groove 16 around the orifice ring 18, is subjected to cutting so that it is formed in compliance with a required characteristic, for example, in a concave face approximately circular-arc-like in cross section in reducing a peak frequency of damping due to resonance action of a liquid column in the orifice path 22.

Figure 30:
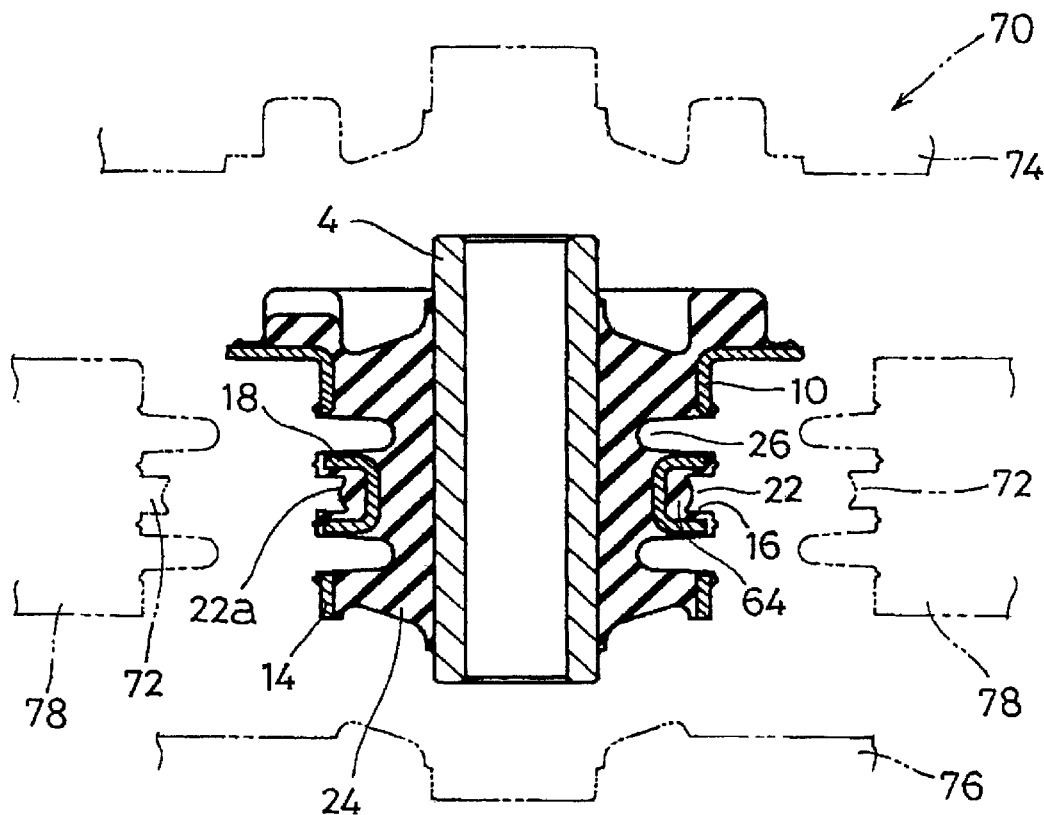
FIG. 30 is a cross sectional view taken along line XXX—XXX in FIG. 28.
Figure 31:
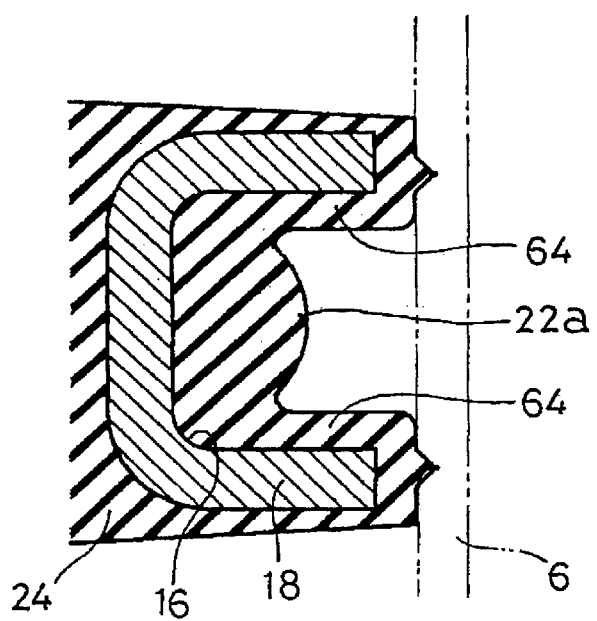
FIG. 31 is an enlarged view of a part of the same.
Figure 32:
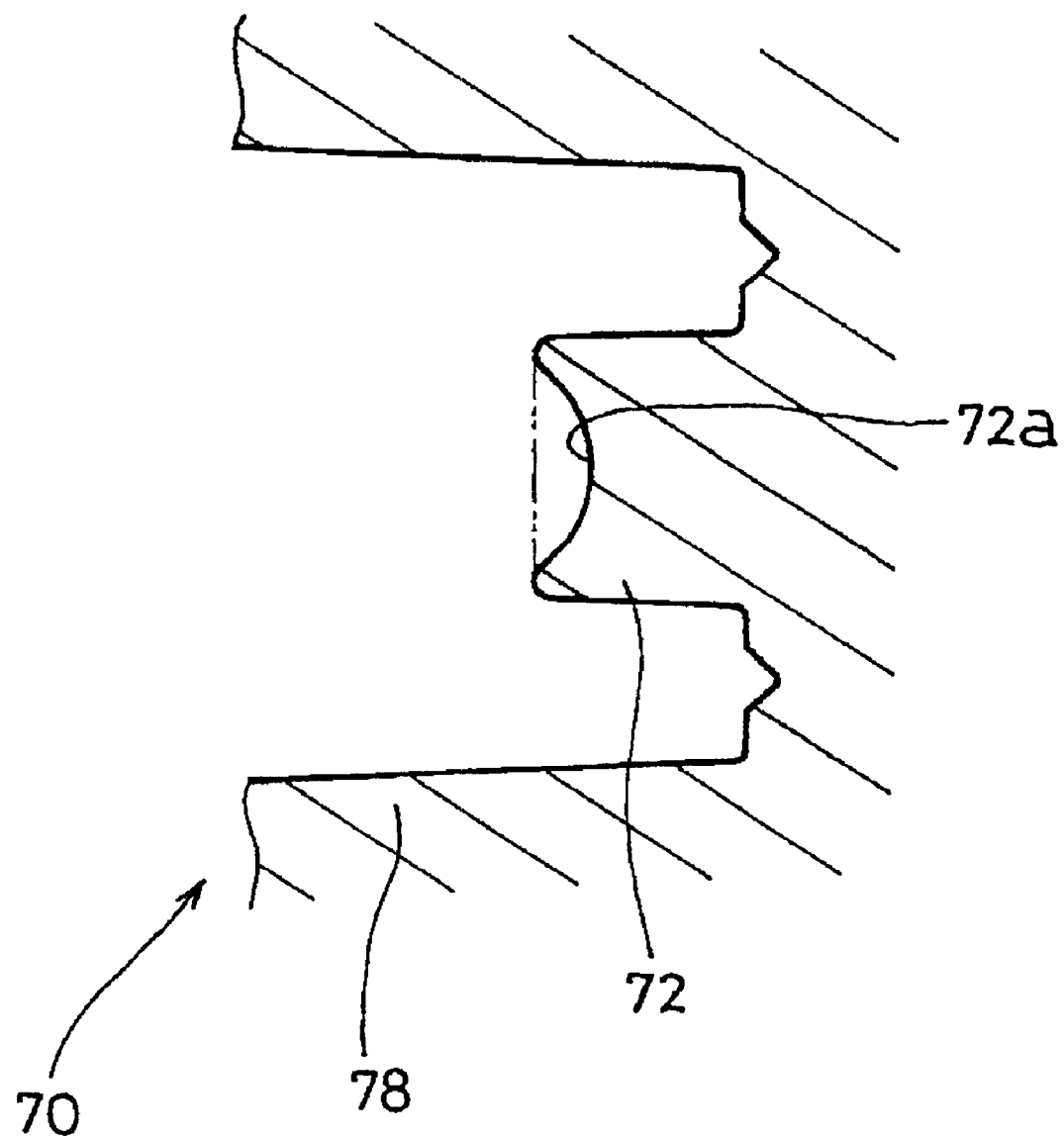
FIG. 32 is a cross sectional view of a part of a molding tool for molding the elastic member.

The above molding tool 70, as shown in chain lines in FIG. 30, comprises both of upper and lower molds 74 and 76 molding the upper and lower faces of the molded form of the elastic member 24, respectively, and a radially dividable intermediate mold 78 provided between both of the upper and lower molds 74 and 76 for molding the outer periphery of the above molded form. The intermediate mold 78 is provided with the projected part 72 on an inner periphery thereof for molding the inner face of the groove 16 around the office ring 18. At the molding in the above first step, as shown in FIG. 32, the inner periphery surface of the projected part 72 is subjected to cutting so as to be formed in a concave face 72a approximately circular-arc-like in cross section. A chain line in FIG. 32 shows an original inner periphery surface. Thus carrying out the molding, the inner bottom face of the rubber coating layer 64 opposite to the outer cylinder 6 in the orifice path 22 can be formed so as to be in a convex face 22a approximately circular-arc-like in cross section.

In thus formed and manufactured liquid-filled type vibration isolator 62, the cross sectional area of the orifice path 22 can be adjusted by the shape of the convex face in the inner bottom face of the above orifice path 22. This can adjust and reduce the peak frequency of damping due to resonance action of the liquid column in the orifice path 22. In particular, the convex face 22a can provide change in the cross sectional form of the orifice path 22 to hardly cause turbulent flow in the orifice path 22. This reduces a pressure loss near the entrance of the orifice path 22 to effectively increase a loss factor as a liquid-filled type vibration isolator.

In addition, by cutting the inner periphery surface of the projected part 72 in concave in cross section as described above, the upper and lower portions in the inner face of the orifice path 22 are provided with depth dimensions from the outer cylinder 6 to the inner bottom surface being remained unchanged from those in the case where the convex face 22a is not formed. This allows, when molding the elastic member 24, the rubber material of the coating layer 64 covering inside and outside of the orifice ring 18 to flow in well balanced to be molded without any problem.

Figure 26:
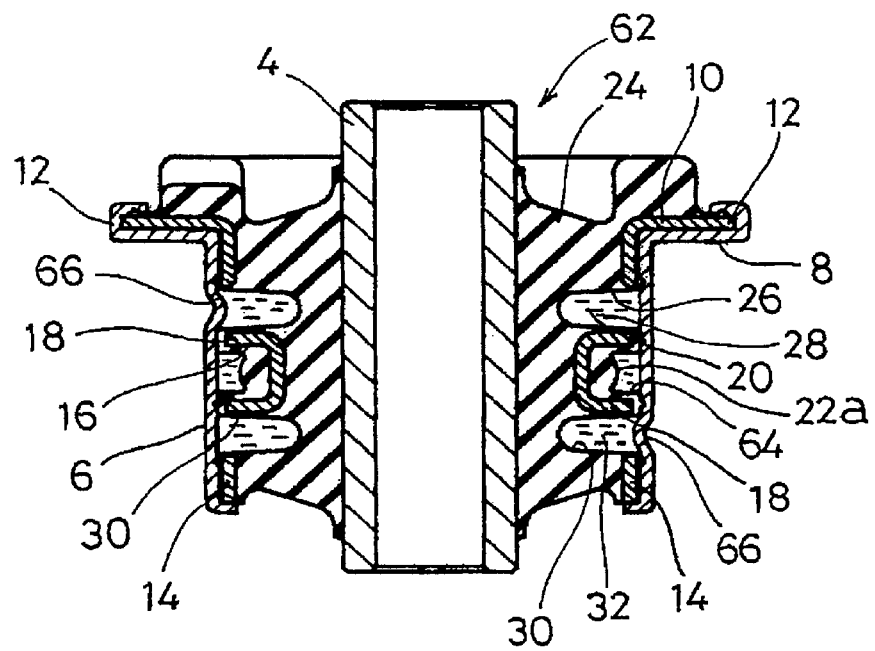
FIG. 26 is a cross sectional view of a liquid-filled type vibration isolator in the fifth example according to the present invention.
Figure 27:
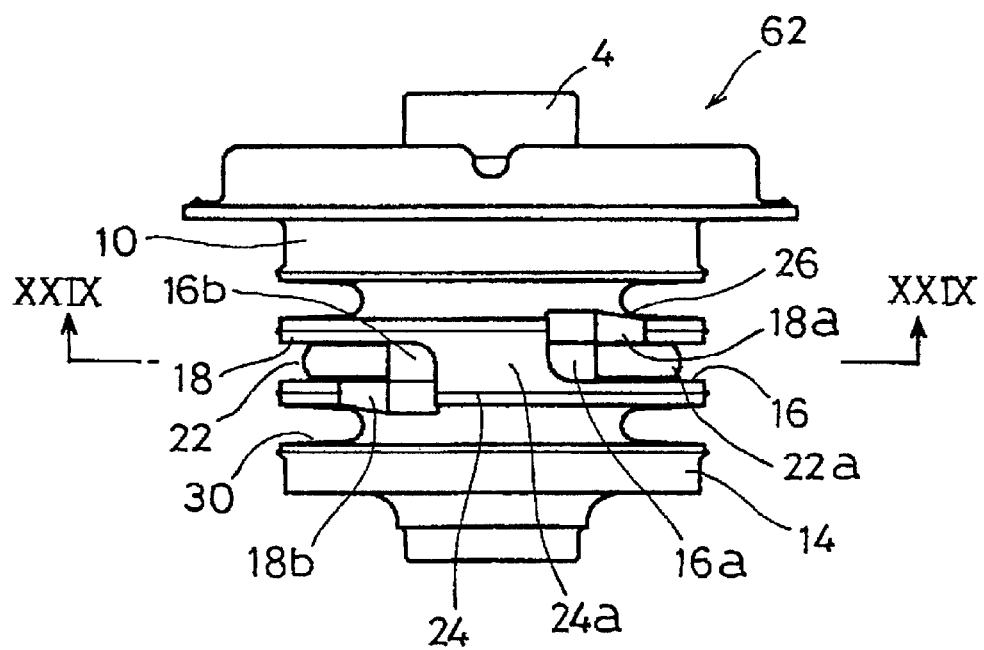
FIG. 27 is a side view of a molded form in which an elastic member is integrally molded with a first ring, a second ring, an orifice ring, and an inner cylinder.
Figure 28:
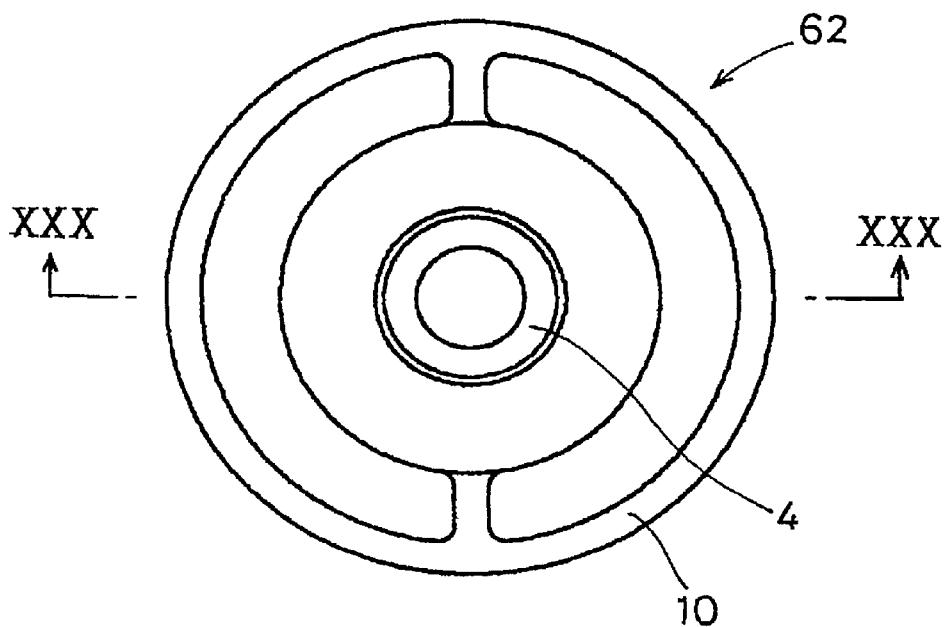
FIG. 28 is a plan view of the same.
Figure 29:
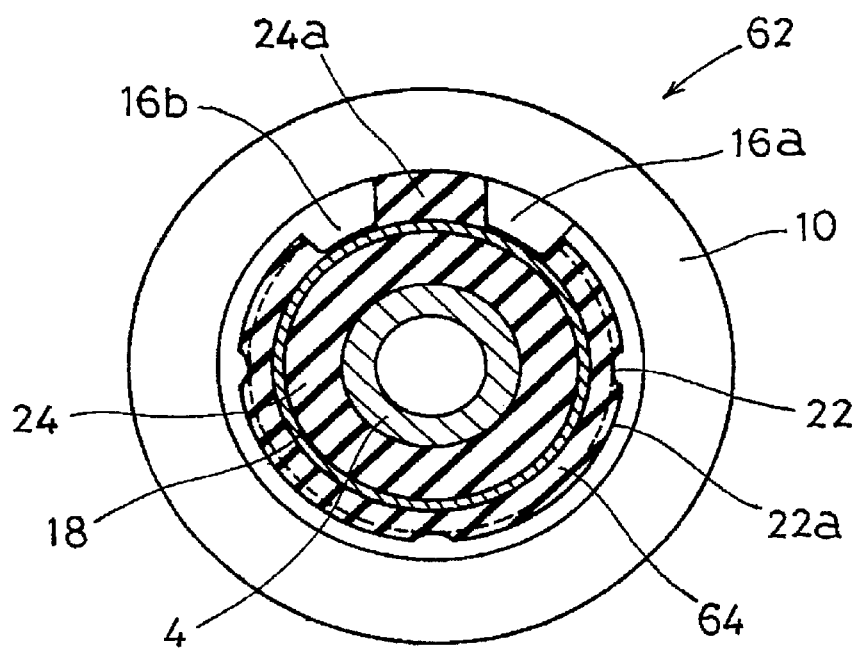
FIG. 29 is a cross sectional view taken along line XXIX—XXIX in FIG. 27.

Also in the fifth example, on the inner periphery surface of the outer cylinder 6, there are formed a plurality of approximately rectangular protrusions 66. The protrusions 66 are separated from one another in the axial direction of the outer cylinder 6 and are made protruded toward the axis of the outer cylinder 6. The protrusions 66 are provided so that they engage with at least two of the first groove 26, the second groove 30, and the orifice ring 18, for example, as shown in FIG. 26, engage with the first groove 26 and the second groove 30.

Furthermore, in every above example, there can be used rigid synthetic resin material, in particular nylon 6, 6 resin, for the orifice ring 18 to thereby achieve light weight.

What is claimed is:

1. A liquid-filled vibration isolator comprising:
   an inner cylinder;
   a first ring being approximately L-shaped in cross section;
   a second ring;
   an orifice ring arranged between the first ring and the second ring, the orifice ring being approximately U-shaped in cross section;
   an elastic member of rubber material being cylinder-like, the elastic rubber member having an in-cylinder face integrally combining with the inner cylinder and an out-cylinder face integrally combining with the first ring, the orifice ring, and the second ring, and having a first groove formed on the out-cylinder face between the first ring and the orifice ring, and a second groove formed on the out-cylinder face between the orifice ring and the second ring; and
   an outer cylinder integrally combined with the first ring and the second ring, the outer cylinder and the first groove forming a first liquid chamber, the outer cylinder and the second groove forming a second liquid chamber, the outer cylinder and the orifice ring further forming an orifice path making the first liquid chamber and the second liquid chamber communicate with each other, and the first liquid chamber, the second liquid chamber and the orifice path being filled with liquid, wherein a coating layer integrated with the elastic member is provided in an inner face of the groove around the orifice ring, the outer surface of said coating layer constituting an inner periphery surface or an inner bottom surface opposite to the outer cylinder in the orifice path formed so as to be a convex face approximately circular-arc-like in cross section.

2. The liquid-filled vibration isolator as claimed in claim 1 wherein the outer cylinder has a plurality of protrusions on an inside surface thereof, the protrusions being made to engage with at least two of the first groove, the second groove, and the orifice ring to be caught thereby.

3. The liquid-filled vibration isolator as claimed in claim 2 wherein a certain plurality of the protrusions are arranged in circle on an inside surface of the outer cylinder so that the protrusions are made to engage with one of the first groove, the second groove and the orifice ring to be caught thereby.

4. The liquid-filled vibration isolator as claimed in claim 2 wherein the protrusions are arranged so as not to overlap with one another in an axial direction on an inside surface of the outer cylinder.

5. The liquid-filled vibration isolator as claimed in claim 2 wherein the protrusions are rectangular, and have four upper protrusions being caught in the first groove at specified intervals and four lower protrusions being caught in the second groove at specified intervals.

6. The liquid-filled vibration isolator as claimed in claim 2 wherein the protrusions have six upper protrusions being caught in the first groove and six lower protrusions being caught in the second groove.

7. The liquid-filled vibration isolator as claimed in claim 2 wherein the protrusions have four intermediate protrusions being caught in a groove around the orifice ring and four lower protrusions being caught in the second groove.

8. The liquid-filled vibration isolator as claimed in claim 2 wherein the protrusions have three upper protrusions being caught in the first groove and four lower protrusions being caught in a groove around the orifice ring.

9. The liquid-filled vibration isolator as claimed in claim 1 wherein the first ring is secured to an end of a flange of the outer cylinder by caulking means, and an end of the second ring is secured to the other end of the outer cylinder by caulking means.

10. The liquid-filled vibration isolator as claimed in claim 1 wherein the orifice ring is formed by stamping out from a metal sheet a pair of annular members each having a center opening, raising an inner edge of each of the annular members stamped out approximately in L-shape in cross section, and combining the raised ends by butt welding.

11. The liquid-filled vibration isolator as claimed in claim 1 wherein the orifice ring has a pair of cutouts making the first liquid chamber and the second liquid chamber communicate with the orifice path, respectively.

12. The liquid-filled vibration isolator as claimed in claim 1 wherein the orifice ring is made of nylon 6, 6 resin.

13. A method of manufacturing a liquid-filled vibration isolator comprising:
   a first step of molding an elastic member of cylinder-like rubber material having an in-cylinder face integrally combined with an inner cylinder and an out-cylinder face integrally combined with a first ring, an orifice ring, and a second ring, the elastic member having a first groove formed on the out-cylinder face between the first ring and the orifice ring, and a second groove formed on the out-cylinder face between the orifice ring and the second ring;
   a second step of forming a plurality of protrusions on an inner face of an outer cylinder; and
   a third step of assembling the elastic member and the outer cylinder in liquid, wherein
      the first step of molding the elastic member includes setting of the first ring, the orifice ring, the second ring, and the inner cylinder in a molding tool, and injection of the rubber material into the molding tool for integrally molding the elastic member together with these component members, and
      in the first step of molding the elastic member, an inner periphery surface of a projected part of a mold is subjected to cutting beforehand approximately in concave in cross section, the projected part being for molding an inner face of a groove around the office ring, and the mold being for integrally molding the elastic member with the inner cylinder, the first ring, the second ring, and the orifice ring.

14. The manufacturing method as claimed in claim 13 wherein the second step of forming the protrusions includes setting of an inner mold inside the outer cylinder, setting of an outer mold around the outer cylinder, and an application of a specified force to the outer mold for forming the protrusions.

15. The manufacturing method as claimed in claim 14 wherein the inner mold is column-shaped with an outer diameter approximately equal to an inner diameter of the outer cylinder and has a plurality of depressions on an outer face thereof, and the outer mold is cylinder-shaped with an inner diameter approximately equal to an outer diameter of the outer cylinder and has a plurality of protrusions at positions corresponding to the respective depressions on the inner mold.

16. The manufacturing method as claimed in claim 14 wherein the inner mold is constituted of an upper mold and a lower mold being divided from each other by a stepped parting line comprising line segments along a circumferential direction and line segments along an axial direction, the depressions are arranged on an outer face of the inner mold so as to be positioned on the parting line, and the outer mold is divided at equal intervals into a plurality of parts so that the outer mold can be radially disassembled.

17. The manufacturing method as claimed in claim 13 wherein the molding tool comprises both of upper and lower molds molding the upper and lower faces of them, respectively, and a radially dividable intermediate mold provided between both of the upper and lower molds for molding outer periphery, the intermediate mold being to be provided with the projected part on an inner periphery thereof for molding the inner face of the groove around the office ring, and the inner periphery surface of the projected part being subjected to cutting in concave approximately circular-arc-like in cross section for forming an inner bottom face of an orifice path in convex approximately circular-arc-like in cross section, the inner bottom face being opposite to the outer cylinder.

* * * * *